Feb. 7, 1956  J. O. ALMEN ET AL  2,733,797
CLUTCH WITH POROUS COMPRESSIBLE FRICTION LININGS
Original Filed Dec. 20, 1942  2 Sheets-Sheet 1
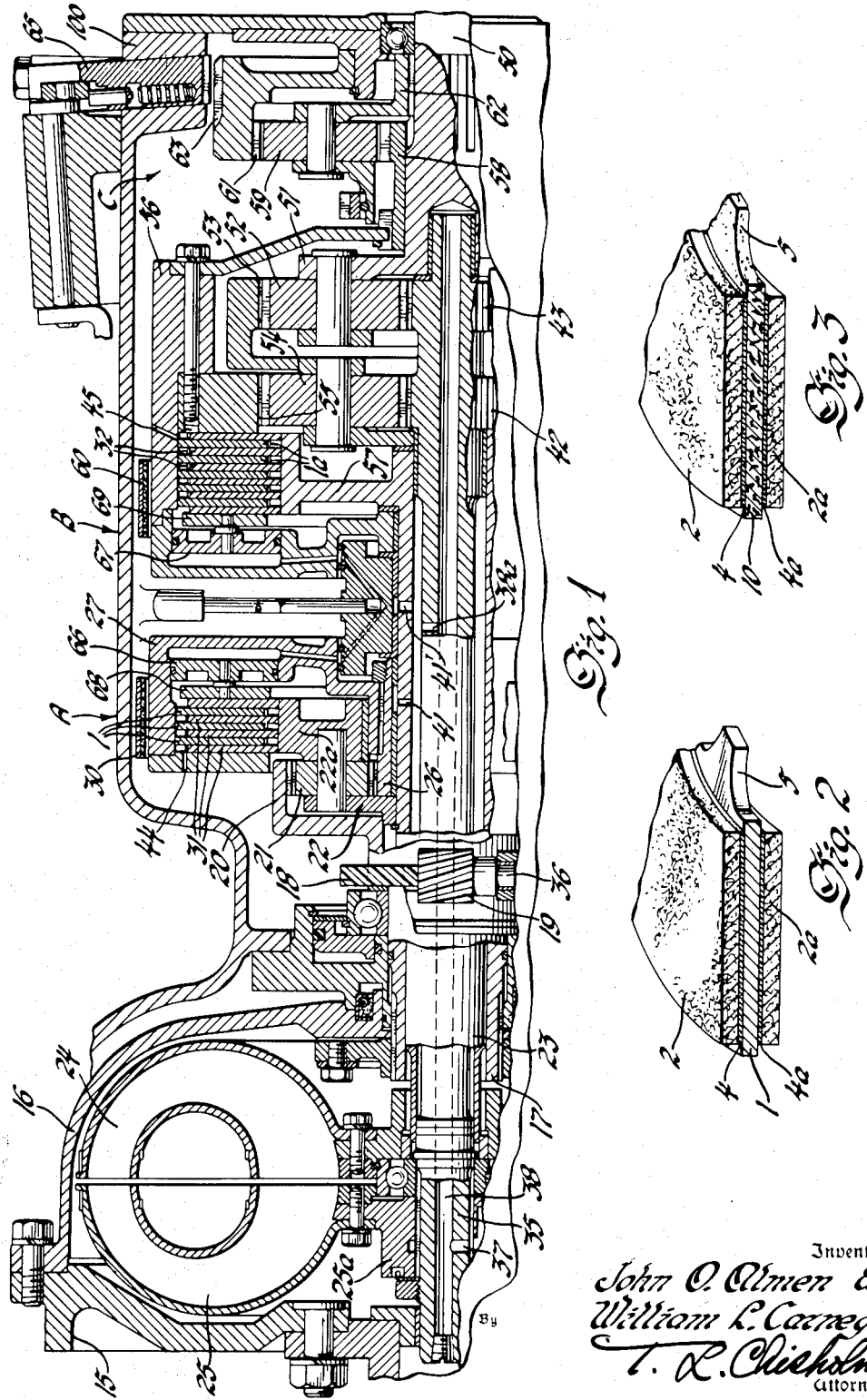
Inventors
John O. Almen &
William L. Carnegie
T. R. Chisholm
Attorney Feb. 7, 1956 J. O. ALMEN ET AL 2,733,797
CLUTCH WITH POROUS COMPRESSIBLE FRICTION LININGS
Original Filed Dec. 20, 1942 2 Sheets-Sheet 2
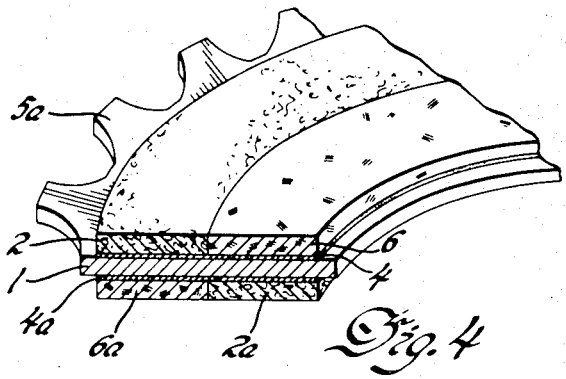
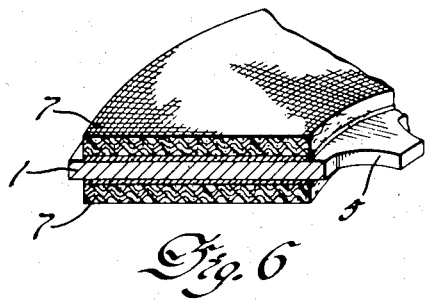
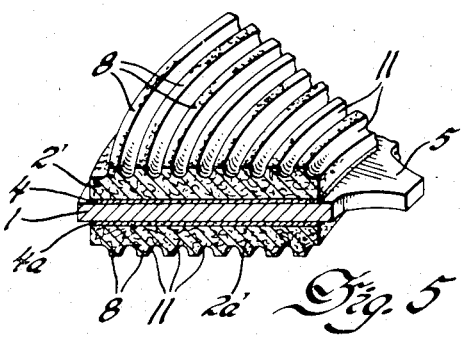
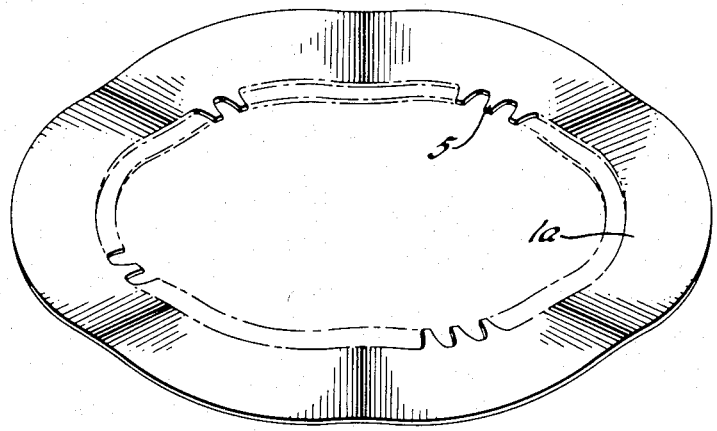
Inventors
John O. Almen &
William L. Carnegie
T. L. Chisholm
Attorney

United States Patent Office

2,733,797
Patented Feb. 7, 1956

2,733,797

CLUTCH WITH POROUS COMPRESSIBLE FRICTION LININGS

John O. Almen, Sierra Madre, and William L. Carnegie, Romeo, Mich., assignors to General Motors Corporation, Detroit, Mich., a corporation of Delaware Continuation of application Serial No. 717,512, December 20, 1942. This application November 17, 1953, Serial No. 392,596

21 Claims. (Cl. 192—107)

This is a continuation of application Serial Number 717,512 filed December 20, 1946, now forfeited.

The invention relates to improvements in friction plates for clutches and brakes adapted to run in oil or other lubricant, and in particular to a composite friction plate such as could be used in a transmission drive assembly such as shown in U. S. 2,357,295 to Earl A. Thompson issued September 5, 1944.

The composite plate as described below consists of a metal disc of either stamped stock or of sintered metal having a wear-face made up of fibrous or woven material. The metal may be steel or other suitable sheet stock. The wear-face is stiffened by the use of a plastic coating on the fibers of the thermo-setting type, applied so as to leave interstitial voids between the fibers, the mat so formed having the character of a sponge. An adhesive coating layer of such thermo-setting plastic is preferably placed on the supporting metal disc, the whole heat setting operation taking place in an oven with the composite disc under a given mechanical pressure.

One object of the invention is to form composite friction discs suitable for clutches and brakes in forms adaptable for either single or multiple disc units, the thermosetting plastic being chosen so as to be non-sensitive to temperature changes or to oil lubricants.

In making up this plate, we find that the fibers may be of organic or mineral material such as felted cellulose paper, synthetic viscose wool, asbestos, glass wool, and other materials of like fibrous nature. These may be either felted or woven, the fundamental requirement being that when the body of the material is wetted with a thin solution of thermo-setting cement, there are space voids left in the spaces between the fibers in all dimensional directions to preserve its ability to permit inflow and outflow of oil. This procedure has been found to provide stiffness with elasticity avoiding compacting of the material which would destroy its porous nature, and thus provides long life in a clutch subject to high torques per square inch of surface and to the action of rapidly circulated lubricant.

In the appended drawings:

Fig. 1 is a longitudinal section view taken through a transmission assembly to show the use of the clutch plates of the present invention.

Fig. 2 is a part section and projection view of a clutch plate having wear surfaces of felted mat material affixed to a plain support disc by a thermo-setting bonding layer.

Fig. 3 is similar to Fig. 2 except that the support disc is made of sintered metal which provides greater surface anchorage than the plan disc.

Fig. 4 is a part section of a composite clutch disc having double rings of different forms of wear facings, to provide differential friction characteristics in one plate.

Fig. 5 is a view like that of Fig. 1 in which the felted mat facing is channeled for controlled oil relief. Fig. 6 shows a form of composite disc having woven mat facings. Fig. 7 is a view of a wavy disc, so formed to provide a controlled loading interval and to increase the axial elasticity of the stack of clutch discs for desired special loading and unloading characteristics. This disc may be used in the clutch disc assemblies of Fig. 1.

In our process to be given in detail below, we use a cement mixture, as an example, of the following specifications:

*Formula I.—Resin (parts by weight)*

47 parts phenol crystals
51.5 parts formaldehyde sol. 35 to 40 pct. Tec.
1.5 parts ammonium hydroxide 28 pct. sol.

Mix in flask connected to refluxing and distilling apparatus. Continue refluxing 1 hour after mix temperature reaches 200 deg. F., then distill under maximum vacuum for 45 minutes, for removal of water. Agitate mixture constantly during both operations, maintaining bath at boiling temperature of water. At peak of refluxing, resin temperature is held at 210 deg. F., dropping to 204 deg. F. at end of refluxing. In distillation, resin temperature may drop to 120 deg. F. and rise to 160 deg. F. during distilling action. Store resin at 50 deg. F., until ready to be used.

*Formula II.—Cement (parts by weight)*

115 parts resin of Formula I.
150 parts propylalcohol (for visc. 90–100 deg. M.)
50 parts China clay (selected kieselguhr)
6 parts powdered hexa-methylene-tetramine Stir-mix thoroughly to dissolve hexa., adding China clay after solution mix is clear and not lumpy. Store at 50 deg. F. until ready for use.

*Formula III (Procedure)*

1. Mix equal volume of resin of Formula I with isopropyl alcohol which will give a solution of 20 to 25 pct. solids ratio after evaporation.
2. Impregnate felted rings in solution of step 1 for 2 to 3 minutes. Centrifugally spin off excess resin solution.
3. Dry in oven at 200 deg. F. for 30 minutes. Test for spongy nature of ring.
4. Apply cement of Formula II to metal disc. Wipe off excess to 0.005" thickness. Pre-dry with 5 minute infrared exposure. Bonding layer should be slightly tacky.
5. Assembled dried impregnated rings of step 3 with cement coated discs of step 4. Press mechanically to remove air bubbles and initiate adhesion of rings to disc.
6. Bake 20 minutes at 300 deg. F., in air circulation furnace.
7. Clean baked article of excess cement, including droplets on faces of felted discs.

The above formulas for producing the complete clutch disc of the present invention are not to be understood as restricting the scope of the invention—but are given to make the invention wholly clear in principle.

One skilled in the art, with these instructions is able to reproduce the invention in different forms. Other resins and solvents may be utilized without departing from the teachings herein, and variations and modifications of the procedural steps given in Formula III are likewise available to the skilled worker in this field.

In Formula III, for example, step 4 may be replaced by substitution of a bonding layer ring cut from a sheet or film of plastic having the Formula II and assembled between metal disc and the felted, impregnated ring in step 5. In this a light coat of wet cement may be given the metal disc to promote bonding, prior to mechanical pressing for initial adhesion.

In Fig. 1 sectional view is of a transmission assembly as described in the aforesaid Letters Patent U. S. 2,357,295 issuing September 5, 1944 to Earl A. Thompson.

The engine shaft flywheel 15 is attached to drum 16 coupled to hollow shaft 17 terminating in annulus gear 20 of gear unit A, meshing with planet gears 21 supported on carrier 22 attached to hollow shaft 23 affixed to fluid flywheel impeller 24. Sun gear 26 meshed with planets 21 is attached to drum 27 externally braked by band 30 and internally splined for coned steel clutch discs 31 mating with discs 1 splined on an extension hub 22a of carrier 22.

The fluid flywheel rotor 25 is attached to shaft 35 on which is formed the sun gear teeth 42 and 43. Shaft 35 is drilled centrally and radially at 38 and 38a to feed oil to the gearing and to the interior of the drums such as drum 27. Pump drive gear 18 of shaft 17 meshes with gear 19 of pump shaft 36 driving pump P (not shown) connected to feed oil to the working space of the fluid flywheel 24, 25 and from thence through passage 37 in hub 25a to central shaft hole 38.

Hollow shaft 23 is drilled radially at convenient points 41, 41' to lead an oil film under pressure, outward to the bearings, gears, and to the clutch and brake faces. Relief holes as indicated at 44, 45 serve to release excess oil reaching the interior of the drums.

The gear unit B has output shaft 50 attached to carrier 51 supporting planets 52 meshing with sun gear 43 and annulus 53 forming the carrier for planets 54 meshing with sun gear 42 and with annulus 55 attached to drum 56. The drum 56 is braked by band 60 and splined internally for clutch plates 32 mating with plates 1a splined to hub 57 attached to shaft 23.

Gear unit C has sun gear 58 attached to drum 56, and annulus gear 61 meshing with planets 59 supported on carrier 62 splined to output shaft 50. The annulus gear member 61 is rotatable on an extension of the casing 100, and toothed at 63 for engagement by toothed pawl 65, to stop rotation of annulus 61.

The clutch plate groups of units A and B are loaded by fluid pressure applied to the pistons 66 and 67 and pressure plates 68 and 69 respectively by external fluid feed controls not involved in the present invention. This pressure may be derived from pump P or from another pump which circulates oil to the transmission and clutch elements. The body of oil in this system is retained in the transmission sump from which pump P draws. The clutch of gear unit A has steel discs 31 mating with plates 1 and that of gear unit B has similar steel discs 32 mating with plates 1a. The plates 1 and 1a are intended to be made in accordance with the instruction of this specification.

The stiffening mixtures noted above may be almost water thin, and are soaked into the formed rough discs which have been cut from sheet stock to desired shape. After this wetting, the rough discs are air dried, which process may be accelerated by the blowing of de-humidified warmed air upon them. The thinner ingredients evaporate, leaving each of the fibers encased in a sheath of the plastic, with plastic joints at the points of intersection of the fibers. When the felted piece is dry it is laid over a coating of plastic cement formed on the supporting metal plate, of the same general formulation as that originally used in wetting the felted plate, but the coating mixture contains less of the solvent thinner. This coating is first wiped with a blade at uniform pressure to remove the excess, and is then ready for affixing the felted piece or mat to the metal disc, which may be of iron, steel, bronze or other alloy.

The metal discs are chemically or otherwise cleaned, and may be coated with the heavier bodied cement prior to applying the rough wearface disc; the latter disc is then applied to the metal disc under controlled light mechanical pressure to squeeze out the air bubbles so as to form a tight bond with the metal, and the assembly is then inserted in an oven, and maintained in a spacer clamp under light mechanical pressure, for a predetermined baking period at relatively low temperature in the range of 290 to 310 deg. F. The spacer arrangement is to control the degree of mechanical pressure for avoidance of compacting. The degree of holding or fixture pressure may be only a few pounds, much less than the heavy mold pressures ordinarily used in this art which are normally from 300 to 1000 pounds per square inch, for solid mold end products.

After cooling and inspection, the composite plate is ready for use. Instead of the adhesive coating being applied in liquid form, this material may be cut in a dried film state and placed between felted disc and support plate prior to heat assembly in the final setting operation. In the figures the numerals 4 and 4a denote the bonding layer, applied either in fluid or dry form.

For discs requiring wear-faces on both sides, the second rough disc is affixed to the metal disc in the same manner as outlined above, and the assembly is then baked as a unit.

So as to provide some specific examples of the objects and advantages it is deemed useful to describe in exact detail at least one article and sequence of making it for proper instruction of those skilled in the art. In Figure 2 we show a broken-away projection view of a portion of a typical clutch plate. A metal plate 1, which may be of bronze, steel, cast-iron or other useful alloy, is made chemically or mechanically clean prior to succeeding operations combining it with the wear-surface discs 2 and 2a. The splines 5 are for the purpose of requiring the composite clutch disc to rotate with a drum as a part of a drive assembly. The spline teeth may also be formed in the outer periphery, as is shown in Fig. 4. The finished article as sectioned in Fig. 2 shows the central plate 1 with the spongy wear surfaces attached to both faces, the bonding layer 4 being emphasized. It will be understood by those skilled in the art that the plastic bonding layers 4 and 4a made up as described above, and thermo-set application of heat, has an intimate relationship with the surface crystal formation of the metal strip and with the fibrous body of the attached or cemented working face. This gives a homogeneous bond not otherwise readily obtained, and tends to prevent local loss of adhesion by the uniform nature of the whole plastic bond body of plate and fibers.

In Figure 3 we show a similar section to that of Figure 2 with the exception that instead of the metal strip plate 1, a sintered metal piece 10 is substituted. The processing of the latter in the forming of the composite article may be somewhat different, due to the fact that it may be undesirable to trap or pocket bodies of plastic, oil or thinner inside the metal sponge of the sintered plate 10. To guard against this undesired result, the sintered plate 10 may be slightly wetted with the thermo-setting combination given above in the Formulas I and II, and centrifugally dried, so that during the succeeding oven operation the pore system of the sintered metal plate 10 will be exposed to the atmosphere through the pore system of the felted material in the body 2, cemented thereon. In practice, it is desirable to drive off the excess thinners by evaporation with warmed, dried air, over a longer time than normally required for the drying of the felted paper bodies 2 and 2a alone. The operator should have no particular difficulty in using the sintered plate, if such be desirable.

Experience has indicated a need for utilizing materials for the wear-faces of these discs having different degrees of compressibility and different coefficients of friction. In the plate assembly shown in Figure 4 a two-part wearface is shown. The metal strip 1 is toothed externally at 5a for the reason given above, and has on its top face an affixed inner circular ring 6 made of cork, and at the outer periphery of which is a spongy ring of felted fibers 2 similar to that shown in Figures 2 and 3. The cork piece 6 may be of cemented cork fragments, or cut from a continuous cork layer sheet as peeled from the bark of the cork oak tree. In applying the cork ring 6 to the plate 1 a heavy-bodied cement having a low thinner or solvent ingredient is best usable. Since the cork piece may have a somewhat higher degree of compressibility, as used in a clutch, it will be compressed during the preliminary loading of the clutch in which it operates, and its coefficient of friction will provide initial clutch torque capacity, followed by the application of the torque in greater proportion to the external felted ring 2. For this purpose the thickness dimension of the cork may be slightly greater than the finished dimension of the felt disc. The lower face of the plate of Fig. 4 may be arranged with the cork face 6a on the outer periphery and the felted piece 2a in the inner position.

In the above instructions, where reference is made to the spongy felted material we are referring likewise to a material which is essentially a form of bonded paper, or cardboard. It is believed worthy of comment that clutches handling a very high torque capacity per square inch, equivalent to that of metal face clutches, and with less loading requirement, have proven experimentally satisfactory, over many miles of operation such as is experienced in a motor vehicle. These findings are, of course, in the use of clutch plates made according to the instructions herein in clutch assemblies which are deliberately designed to maintain a moving stream of cooling lubricant over the faces of the clutch discs during the periods of engagement and disengagement, at which times, otherwise, serious abrasion might occur.

In Figure 5 we show a composite plate 2' on the upper face, in which the felted material is channeled into lands 8, the depth of which is approximately equal to the width of the grooves 11 between the lands, the net wear area of the lands 8 being taken for the required torque capacity of the plate. The Figure 5 showing is similar in all respects to that of Fig. 2 except that channeled plates 2' and 2a' are shown. It will be observed that upon initial application of plate loading, the fibers supported in their plastic sheaths will deflect under loading pressure, and there will be a small degree of lateral bulging of the felted material in the grooves 11, which will have the effect of diminishing the amount of oil which may be trapped therein, with increase of clutch loading. The grooves 11 may be entirely circumferential, or may be spiral, as desired for the proper ejection of excess oil from the working area. The bases of the grooves are preferably curved as shown.

Figure 6 is to show the use of woven material in place of the felted material of the other figures, the woven discs 7 being pre-treated similar to the processing given the felted discs, having likewise a prior wetting of the thin plastic solution, followed by drying, application of the denser bonding layer plastic to the base plate 1, and when assembled ready for the oven, the piece has the appearance of the Figure 6 section. It should be understood that the degree of mechanical pressure applied during the oven process may under special circumstances, be very slight or may rise as high as 1000 pounds per square inch for heavy machinery plates, depending upon the ultimate size, design and power requirements of the unit in which the disc is to be installed, since under heavy compressions and with a strong cement the bonding action will be accompanied by a squeezing of the fibers which reduces the volumetric space of the voids in which oil may flow. An oil saturated plate for light work other than for so-called heavy machinery may be formed with as little as 2 to 5 pounds per square inch, with the plastic solutions noted above, for example, in a structure such as shown in Figure 1. The woven disc 7 in practice provides a reticulated wear-face pattern.

Figure 7 shows a special form of wavy disc 1a, so formed that upon initial loading, the torque carried by the stack of plates such as in unit A of Fig. 1 is first delivered by the small peak areas which progress in size as the discs are flattened by the pressure provided from axial motion of the pressure plate 68, for example, caused by movement of piston 66 to the left. It should be remembered that unloaded, the mating discs are conical, and are also flattened by the loading pressure.

The wavy discs 1a are fitted with wear facings in the same manner as set forth above for the flat discs. In practice, it is found that the slight axial flexing of a plate so made does not cause loosening of the bonded layers 4, 4a, because the felted or composite material flexes uniformly with the steel disc to which it is attached.

As noted above, the plain steel clutch plates 31, in their unstressed condition may be coned, and the plates 1a being wavy as shown in Fig. 7. It is therefore obvious that when the loading force is applied by either of the members 68 or 69 of Fig. 1, the coned plates 31 are flattened and the composite plates 1a are also flattened, the resilient characteristics of both serving to provide a clutch release spring action.

The Fig. 4 form of composite plate shows the external sponge ring face 2 and the internal cork ring face 6 on the upper side, and the external cork ring face 6a and the internal sponge ring face 2a on the lower side.

It should be observed that in assembling one of the clutch groups A or B, there are two possible methods of interleaving the sets of plates—one in which under applied load the inner cork face 6 of one side and the outer cork face 6 of the opposite side will make initial contact with the inner and outer portions of the respective cone faces of the steel discs 31—so that initial torque is sustained only by the cork faces, followed by final full contact of both sets of faces as the plates are flattened. The alternate arrangement is obviously that of phasing the coned discs 31 with respect to the inner and outer ring faces of the Fig. 4 form such that the initial torque is sustained only by the felted sponge faces 2 and 2a, followed by the full face contact at maximum loading compression. The designer may choose either of these alternatives, in accordance with the desired build-up of torque to be transmitted.

A word as to the modern theory of wet clutches is believed instructive at this point. For many years dry clutch plates faced with organic materials, or with combinations of organic with mineral fibers, and molded, have been in use. Experience with this class of wear-face material is that an inevitable charring of the organic material takes place even in an oil bath, with eventual deposition of gums from the body of the lubricant. This is true because of the momentary high temperatures existing on the wear-faces, during the loading cycle. Thermocouple tests show that the surface fibers of such clutches must withstand momentary temperatures far beyond those which organic fibers can of themselves resist without changing their chemical nature. To circumvent this phenomenon, we have devised the special combinations described herein in which useful coefficients of friction and of torque capacity per square inch are achieved, at the same time yielding maximum exposure of the contact areas of the fibers to the stream of cooling lubricant. There appears to be a direct relationship between the net area of the individual fiber or particle in the clutch surface with respect to the interstitial space and the cooling effect resulting from a given velocity of lubricant moving across the clutch face. In the present invention we have not only provided for a small fiber or particle in the working surface, but also provide adjacent pores and tiny channels through which the lubricant may flush. In the case of Figure 5 larger channels are superimposed, for the benefit of the designer who wishes to control the lubricant flow and retention with a degree of exactness.

Rather extraordinary results are obtained with clutch plates made in accordance with the instructions herein, and these results include the use of the discs as friction brakes, wherein one of the disc-holding members is non-rotatable. A further advantage appears in the relatively small size of a clutch assembly for a given torque handling capacity, in the present invention, it being found that the overall dimension allowance for a given clutch problem may be scaled down as much as 30% below those of existing commercially used dry clutches. This saving is achieved on a dimensional basis, but a further saving appears in the provision herein of less expensive, and more easily controlled compressible materials. From the point of view of an overall economy wherein expensive metals, such as special bronzes and similar alloys are replaced by cheaper organic substances, a general benefit is conferred upon the public, in commercial use of the invention.

There are a number of plastic mixtures which are adaptable to the purposes described herein, and it is believed only necessary to show the above listed operable materials of this type, by way of example, since a designer provided these teachings would require a latitude of selection of plastics which would enable him to meet the design requirement for operating temperatures, and therefore in the above example we have provided known materials which yield proper operation in a clutch of current, standard automobile or automotive specifications.

It will therefore be seen that the composite friction unit clutch plate which we have shown and described, may be made up of various fibrous and plastic materials, and in various shapes and forms, and we therefore desire that a broad construction be placed upon our invention as a composite friction torque absorbing plate in ring form, made of fibrous substances forming the wear-faces, the fibers thereof being individually supported by thermo-setting plastic sheaths and bonded to a metal backing plate by a thermo-setting bonding layer; the plate also being formable with plural wear-face rings of different fibrous structure as described above. It is therefore obvious that any changes in detail, arrangement and selection of parts may be made as above shown and described, and we therefore do not desire to be restricted in the scope of our invention except as properly limited by the appended patented claims.

We claim as our invention:

1. A composite circular friction clutch member for use in conjunction with a quantity of circulating lubricant, said member comprising a metal disc with a compressible wear-face adhering thereto consisting of a body of fibrous structure stiffened by a plastic coating which sheathes the fibers thereof and having connecting interstitial voids between the said fibers, said voids affording flow space for said lubricant, and said body being attached to said disc by a thermo-setting bonding layer composed of the same plastic coating as that which provides the stiffening of the said fibers of the said body of fibrous structure.

2. In the combination set forth in claim 1, the further combination of spaced circumferential channels formed in the compressible wear-face of the said disc, of metal clutch plates cooperating with said member, and of gripping mechanism operative to clutch said member and said plates together for common rotation, during which gripping operation the material of said wear-face between said channels compresses to narrow the space dimension of said channels.

3. The combination set forth in claim 1 wherein spiral channels are formed in the surface of said compressible wear-face of said disc, of metal clutch plates cooperating with the said member, and of gripping mechanism operative to clutch said plates and said member together for common rotation, during which operation the material of said wear-face between said channels compresses to narrow the effective width of said channels.

4. The combination set forth in claim 15, wherein a spiral groove is formed in the surface of said wear-face having a depth approximately equal to its lateral dimension in unloaded condition, and having lesser groove dimensions in compressed condition.

5. A composite clutch disc to be operated in a bath of circulating lubricant consisting of a metal disc fixed to a torque supporting member, said disc having a wear-face one part of which consists of a sponge mat adapted to absorb and release lubricant, said mat being made of organic fibers stiffened by thermo-setting plastic coating sheathing said fibers, another part of which disc is a cork ring, the said mat and the said cork ring being bonded to said metal disc by a thermo-setting adhesive layer of the same material as the said sheathing coating.

6. A clutch plate consisting of a metal disc to which is assembled a wear-face composed of a convoluted structure in annular form as a clutch facing bonded to said metal disc, said wear-face having a felted fiber base and having a thermo-setting resin which forms a plastic coating only for the fibers thereof, such that the coated fibers form a spongy mat and said wear-face having a bonding layer on one face of the mat thereof in intimate contact with the adjacent portion of said disc, the resin material of the bonding layer being of the same chemical nature as that of the said plastic coating of the fibers of the said spongy mat.

7. A friction clutch plate for operating in lubricating oil composed of a metal disc having one or more wear-faces made from a ring-shaped spongy mat of organic fibers, the individual fibers of which are sheathed in thermo-setting cement binding the fibers together so as to leave small oil-flow voids connected therebetween, said cement forming a bonding layer continuity which holds said disc to said mat while excluding said oil from the adjacent face of said metal disc.

8. The combination set forth in claim 7, wherein said mat is provided with a circumferentially channeled wear-face having the depth of said channels approximately equal to their width, whereby under clutch-loading compression the flanks of said channels diminish in size.

9. The combination set forth in claim 6, wherein said wear-face is spirally channeled between its peripheral outer and inner dimensions in the material of said spongy mat, the sectional depth of said channels approximating their width, and wherein the spiral channels provide means for constantly circulating lubricant to the said wear-face and to the said connecting voids of said spongy mat.

10. A friction clutch plate for an oil-immersed clutch lubricated by a circulating oil body, said plate including a metal disc, a spongy mat composed of fibers each sheathed in thermo-setting plastic material of phenol-formaldehyde type which joins the fibers to each other so as to leave connecting oil-flow voids between said fibers, a composite friction wear surface bonded on said disc consisting of concentric rings of cork and of said fibrous mat, and a bonding plastic layer on one face of said disc joining said concentric rings thereto, said layer being continuous over the adjacent surface of said disc, and said layer being composed of the same plastic material sheathing said fibers.

11. A friction plate for an oil immersed torque transmitting device lubricated by a circulating oilbody, said plate including a backing disc, with a wear-face which includes a spongy disc-like mat bonded thereon composed of fibers sheathed in thermo-setting plastic material which joins the fibers so as to leave oil flow voids between, a second element of said wear-face also bonded on said disc consisting of a concentric disc-like ring of corp approximately co-planar with said spongy mat, and an adhesive plastic layer on one face of said disc in contact with both said rings, said layer being composed of the same material as that sheathing the said fibers.

12. A composite circular friction wear-absorbing member comprising a metal disc with a spongy wear-face cemented thereto, consisting of a body of fibrous structure stiffened by thermo-setting plastic coating of the fibers thereof, and having interstitial oil-flow voids between the said coated fibers and throughout the thickness of said body, said fibrous body being bound to said disc by a thermo-setting bonding layer of common continuity and substance with that of said thermo-setting fiber coating.

13. In a disc clutch for operation in a clutch structure constantly lubricated by a circulating oilbody, said clutch having plain metal plates and mating composite plates therewith, the combination of said composite clutch friction plates being composed of flexible metal discs each having spongy, compressible wear-faces attached thereto by a thermo-setting adhesive layer, said wear-faces consisting of fibrous mats stiffened by a thermo-setting adhesive coating of the said fibers so as to leave connecting oil-flow voids between the fibers for said oilbody, and the said discs and wear-faces being formed circumferentially in a uniformly wavy pattern such that the discs and wear-faces may flatten together under axial clutch-applying load and enlarge contact proportionally thereto by the compression of said spongy wear-faces.

14. A clutch-friction disc distortable in direction transverse of its normal plane and adapted to operate under constant lubrication of a circulating oilbody, having in combination a friction face consisting of a spongy wear-surface disc composed of a mat of organic fibers stiffened by a thermo-setting plastic sheathing, of said fibers having interstitial oil-flow voids connecting between the sheathed fibers, and the said face being fastened to the said disc by a thermo-setting adhesive layer composed of the same plastic material as that sheathing the said fibers and bonded to adjacent portions of said sheathing.

15. A composite clutch member to be operated in a circulating bath of lubricant, said member being a composite consisting of a metal disc base formed to support and transmit torque with an oil absorbent wear-face adhering to said disc, the combination requiring said wear-face to be of spongy character and consisting of a mat of fibers sheathed by thermo-setting plastic and bonded to said disc by a thermo-setting plastic layer of the same chemical nature as said first-named plastics and continuous with adjacent portions of said sheathing, the spongy body of said wear-face affording passages between and among the said sheathed fibers for continued in-and-out flow of the lubricant of said circulating bath.

16. The combination set forth in claim 12, wherein said metal disc is made of metal sponge material having connecting interstitial voids permitting flow of oil through same, of said bonding layer being discontinuous at its surface contact with said metal disc, and of the voids of said metal disc communicating with the voids connecting between the said fibers so that oil may flow through the metal disc and wear-face.

17. In the combination set forth in claim 1, oil trapping reservoirs formed by said connecting interstitial voids which afford flow passages for said circulating lubricant whereby said member may be operated in a constantly lubricated clutch assembly.

18. A compressible clutch plate for use in a clutch running in a body of circulating oil, said plate being built up as a composite from a metal disc having a spongy wear-face portion adapted to absorb and release a body of oil circulating through the said spongy portion, the said portion being composed of compressible fibers sheathed in thermo-setting plastic with connecting voids between the said sheathed fibers and bonded with a cement layer of said plastic to said metal disc, the said voids affording flow and reservoir space for said circulating oilbody.

19. A friction member adapted for use in a bath of lubricant, comprising a wear-face and a metal supporting plate therefor, said wear-face consisting of a mat of fibrous structure wherein the fibers are coated and stiffened with a thermosetting resin so as to form interconnecting interstitial voids between the stiffened and coated fibers for affording flow space for said lubricant, said wear-face being coextensively bonded to said supporting plate by a thermosetting resin cement compatible with the coating resin so as to form a bonding continuity with said coating resin.

20. A friction member as defined in claim 19 in which said wear-face comprises concentric rings of cork and fibrous material.

21. A friction member as defined in claim 19 in which said wear-face comprises concentric rings of cork and fibrous material in oppositely disposed concentric relation at opposite side of said member.

References Cited in the file of this patent
UNITED STATES PATENTS

| | | |
|---|---|---|
| 1,673,797 | Brown | June 19, 1928 |
| 1,936,240 | Lane | Nov. 21, 1933 |
| 1,965,326 | Tower | July 3, 1934 |
| 2,050,156 | Borghetty | Aug. 4, 1936 |
| 2,277,602 | Novak | Mar. 24, 1942 |
| 2,415,097 | Hasimoto | Feb. 4, 1947 |